United States Patent [19]

Cronje

[11] Patent Number: 4,474,384
[45] Date of Patent: Oct. 2, 1984

[54] CONVEYANCE

[75] Inventor: Bartlomeus Cronje, Welkom, South Africa

[73] Assignee: Western Holdings Limited, Johannesburg, South Africa

[21] Appl. No.: 400,182

[22] Filed: Jul. 20, 1982

[30] Foreign Application Priority Data

Jul. 24, 1981 [ZA] South Africa .................. 81/5108

[51] Int. Cl.$^3$ ............................................. B62B 1/10
[52] U.S. Cl. .................................. 280/47.24; 280/404
[58] Field of Search ............... 414/458, 459, 490, 440, 414/444, 457; 280/47.24, 47.13 R, 63, 404

[56] References Cited

U.S. PATENT DOCUMENTS 2,636,623  4/1953  Corley .................... 414/458 X

FOREIGN PATENT DOCUMENTS 541999  8/1922  France ........................ 280/47.24

*Primary Examiner*—Joseph E. Valenza
*Assistant Examiner*—Stuart Millman
*Attorney, Agent, or Firm*—Ladas & Parry

[57] ABSTRACT

An elongated object such as a rolled steel section is adapted to be conveyed by means of a trolley supporting it at one end while the other end of the object is supported by a movable platform. The trolley comprises a frame of inverted U-shape to the legs of which are fixed a pair of wheels with a handle being attached to the frame and extending from the plane of the U-shaped frame. A subframe is suspended for rotation from a pivot shaft at the center of the U. The subframe is a square and carries a platform on which the one end of the elongated object rests such that manipulation of the handle facilitates movement and maneuvering of the object.

2 Claims, 3 Drawing Figures

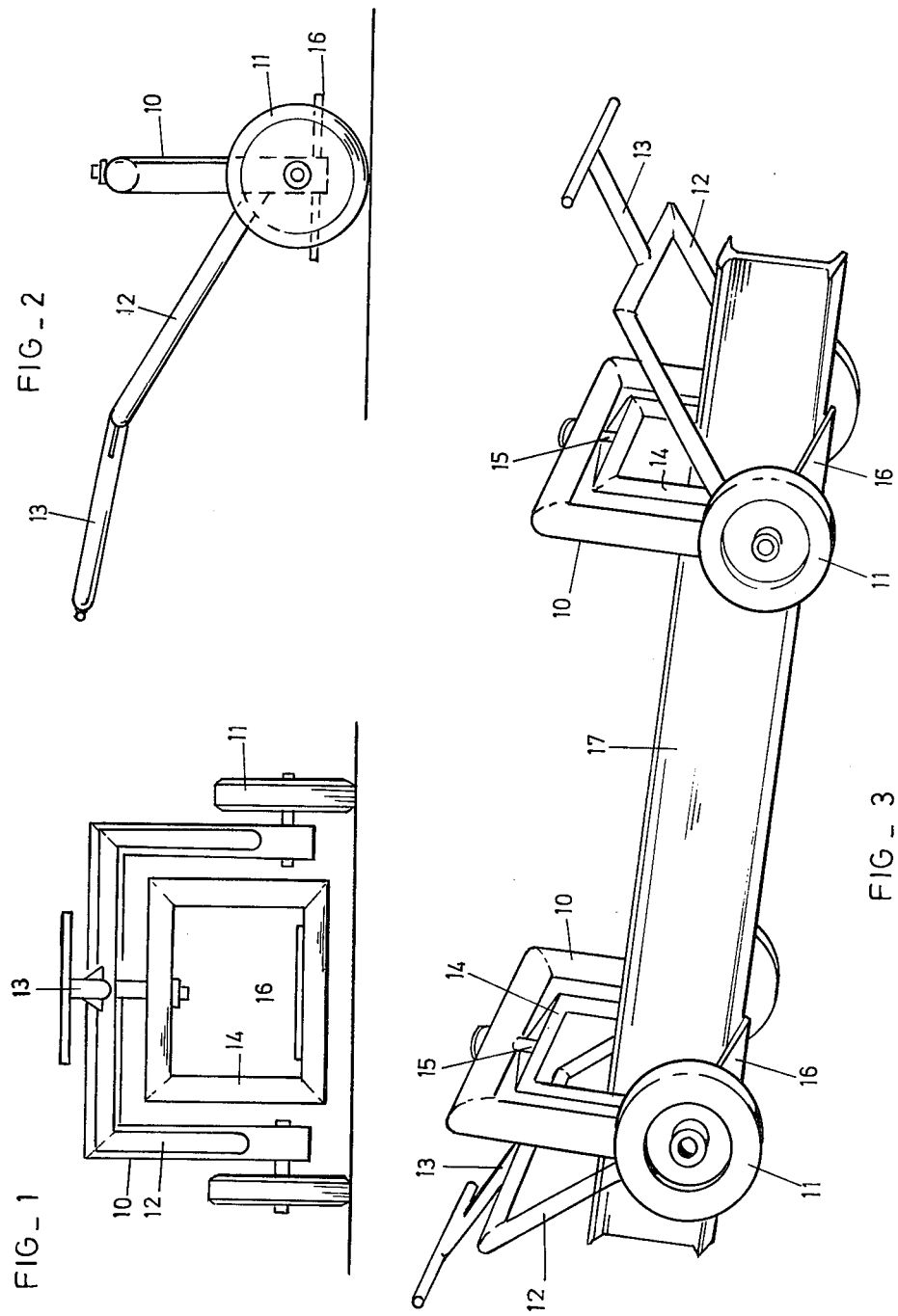

CONVEYANCE

BACKGROUND OF THE INVENTION

This invention relates to trolleys.

In many workplaces there is a problem of conveying elongated heavy objects, such as rolled steel sections, from one place to the other without the benefit of cranes or other motorized equipment.

An object of the invention is to provide equipment by means of which such elongated objects can be readily handled by manual labour.

SUMMARY OF THE INVENTION

According to the invention a trolley for use in conveying elongated objects comprises an inverted U-shaped frame, wheels rotatably mounted about a fixed common axis to the ends of the legs of the U, a handle attached to the frame and extending from the plane of the U, a pivot shaft journalled for rotation at the center of the U about an axis parallel to the legs of the U, and a subframe attached to the pivot shaft for carrying one end of an elongated load.

DESCRIPTION OF THE DRAWINGS

FIG. 1 is a front view of a trolley according to the invention;

FIG. 2 is a side view of FIG. 1; and

FIG. 3 is a pictorial view showing two of the trolleys of FIGS. 1 and 2 in use.

DESCRIPTION OF AN EMBODIMENT

The trolley of the embodiment has an inverted U-shaped frame 10 at the ends of the legs of which there are fixed stubaxles carrying a pair of wheels 11. Extending from the plane of the frame 10 is a U-shaped handle bracket 12 to which is connected a handle 13.

A rectangular frame 14 is pivotally suspended from the center of the frame 10 by means of a pivot shaft 15. At the opposed side of the frame 14 a carrying platform 16 is secured.

If one end of an object, such as a rolled steel joist 17 is lifted on to the platform 16 of a trolley and the other end is wheeled, e.g. by resting on another wheeled platform, the object can be readily pulled along and moved around curves.

However, if as is shown in FIG. 3 two trolleys of the invention are used, one at each end, a conveyance is formed which is highly maneuverable in both directions.

I claim:

1. A trolley for use in conveying elongated objects that are adapted to have one end supported on movable means and with the other end supported by said trolley, and wherein said trolley comprises an inverted U-shaped frame, wheels rotatably mounted about a fixed common axis to the end of the legs of the U, a handle attached to the frame and extending from the plane of the U, a pivot shaft journalled for rotation at the center of the U about an axis parallel to the legs of the U, a subframe attached to the pivot shaft and a carrying platform secured to the subframe and on which the other end of an elongated object is adapted to freely rest whereby the object can be moved about and maneuvered by manipulation of said handle.

2. The trolley of claim 1, wherein said trolley is one of a pair of identical trolleys each having a carrying platform on which the opposed ends of elongated objects can freely rest so that the object can be readily moved about and maneuvered by manipulation of the handle at either end of the object.

* * * * *